(12) United States Patent
Adkisson et al.

(10) Patent No.: US 7,676,530 B2
(45) Date of Patent: Mar. 9, 2010

(54) DURATION MINIMUM AND MAXIMUM CIRCUIT FOR PERFORMANCE COUNTER

(75) Inventors: Richard W. Adkisson, Dallas, TX (US); Tyler Johnson, Murphy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1315 days.

(21) Appl. No.: 11/021,259

(22) Filed: Dec. 23, 2004

(65) Prior Publication Data

US 2005/0283677 A1    Dec. 22, 2005

Related U.S. Application Data

(60) Provisional application No. 60/576,646, filed on Jun. 3, 2004.

(51) Int. Cl.
    *G06F 7/00*    (2006.01)
(52) U.S. Cl. ...................................... 708/207
(58) Field of Classification Search ........... 708/207, 708/671; 340/146.2
    See application file for complete search history.

(56) References Cited

U.S. PATENT DOCUMENTS

| | | | |
|---|---|---|---|
| 4,084,225 A | 4/1978 | Anderson et al. | |
| 4,796,211 A | 1/1989 | Yokouchi | |
| 4,799,190 A * | 1/1989 | Douglas et al. | 708/671 |
| 4,821,178 A | 4/1989 | Levin | |
| 5,260,979 A | 11/1993 | Parker et al. | |
| 5,347,540 A | 9/1994 | Karrick | |
| 5,517,155 A | 5/1996 | Yamauchi et al. | |
| 5,579,527 A | 11/1996 | Chin | |
| 5,581,163 A | 12/1996 | Alves de Lima et al. | |
| 5,588,115 A | 12/1996 | Augarten | |
| 5,590,304 A | 12/1996 | Adkisson | |
| 5,610,925 A | 3/1997 | Takahashi | |
| 5,644,578 A | 7/1997 | Ohsawa | |
| 5,651,112 A | 7/1997 | Matsuno et al. | |
| 5,729,678 A | 3/1998 | Hunt et al. | |
| 5,796,633 A | 8/1998 | Burgess et al. | |
| 5,819,053 A | 10/1998 | Goodrum | |
| 5,835,702 A | 11/1998 | Levine et al. | |
| 5,880,671 A | 3/1999 | Ranson et al. | |
| 5,881,223 A | 3/1999 | Agrawal et al. | |

(Continued)

FOREIGN PATENT DOCUMENTS

| | | |
|---|---|---|
| DE | 3700426 | 8/1987 |
| DE | 102005020656 | 12/2005 |
| EP | 0613091 | 7/2001 |
| EP | 0897152 | 5/2003 |
| GB | 2401447 | 11/2004 |
| GB | 2313829 | 12/2005 |

OTHER PUBLICATIONS

Non-Final Rejection dated May 31, 2007 for U.S. Appl. No. 11/022,021 in the United States Patent Office.

(Continued)

*Primary Examiner*—Tan V Mai

(57) ABSTRACT

A circuit for tracking the minimum and maximum duration of an event of interest is described. The circuit is connected to a counter for counting a number of clock cycles that the event of interest is active and comprises logic for detecting deactivation of the event of interest and generating a duration end signal; logic responsive to the duration end signal for comparing a count value with a shadow value; and logic for updating the shadow value based on results of the comparing.

28 Claims, 5 Drawing Sheets

U.S. PATENT DOCUMENTS

| | | | |
|---|---|---|---|
| 5,881,224 | A | 3/1999 | Ranson et al. |
| 5,887,003 | A | 3/1999 | Ranson et al. |
| 5,930,482 | A | 7/1999 | Carter |
| 5,931,926 | A | 8/1999 | Yeung et al. |
| 5,956,477 | A | 9/1999 | Ranson |
| 6,112,317 | A | 8/2000 | Berc et al. |
| 6,112,318 | A | 8/2000 | Jouppi et al. |
| 6,134,676 | A | 10/2000 | VanHuben |
| 6,189,072 | B1 | 2/2001 | Levine |
| 6,226,698 | B1 | 5/2001 | Yeung et al. |
| 6,356,615 | B1 | 3/2002 | Coon et al. |
| 6,360,337 | B1 | 3/2002 | Zak et al. |
| 6,360,343 | B1 | 3/2002 | Turnquist |
| 6,463,553 | B1 | 10/2002 | Edwards |
| 6,487,683 | B1 | 11/2002 | Edwards |
| 6,502,210 | B1 | 12/2002 | Edwards |
| 6,546,359 | B1 | 4/2003 | Week |
| 6,557,119 | B1 | 4/2003 | Edwards et al. |
| 6,615,370 | B1 | 9/2003 | Edwards et al. |
| 6,658,578 | B1 | 12/2003 | Laurenti et al. |
| 6,662,313 | B1 | 12/2003 | Swanson et al. |
| 6,684,348 | B1 | 1/2004 | Edwards et al. |
| 6,732,307 | B1 | 5/2004 | Edwards |
| 6,750,693 | B1 | 6/2004 | Duewer |
| 6,826,247 | B1 | 11/2004 | Elliott et al. |
| 6,831,523 | B1 | 12/2004 | Pastorello et al. |
| 7,003,599 | B2 | 2/2006 | Warren |
| 7,346,824 | B2 | 3/2008 | Adkisson |
| 7,373,561 | B2 | 5/2008 | Baumer et al. |
| 7,424,397 | B2 | 9/2008 | Adkisson |
| 2002/0054537 | A1 | 5/2002 | Pascucci |
| 2002/0166012 | A1 | 11/2002 | Natarajan et al. |
| 2002/0196886 | A1 | 12/2002 | Adkisson |
| 2003/0036883 | A1 | 2/2003 | Mericas |
| 2003/0217302 | A1 | 11/2003 | Chen |
| 2004/0003329 | A1 | 1/2004 | Cote et al. |
| 2004/0059967 | A1 | 3/2004 | Kleppel et al. |
| 2004/0083077 | A1 | 4/2004 | Baumer et al. |
| 2004/0210782 | A1 | 10/2004 | Hsu |
| 2005/0162199 | A1 | 7/2005 | Green et al. |
| 2005/0283669 | A1 | 12/2005 | Adkisson |
| 2005/0283677 | A1 | 12/2005 | Adkisson |

OTHER PUBLICATIONS

Final Rejection dated Nov. 9, 2007 for U.S. Appl. No. 11/022,021 in the United States Patent Office.
Non-Final Rejection dated Mar. 30, 2008 for U.S. Appl. No. 11/022,021 in the United States Patent Office.
Final Rejection dated Aug. 5, 2008 for U.S. Appl. No. 11/022,021 in the United States Patent Office.
Examiner' Answer to Appeal Brief dated Dec. 17, 2008 for U.S. Appl. No. 11/022,021 in the United States Patent Office.
Non-Final Rejection dated Mar. 18, 2008 for U.S. Appl. No. 11/022,079 in the United States Patent Office.
Examiner Interview Summary dated Mar. 18, 2008 for U.S. Appl. No. 11/022,079 in the United States Patent Office.
Final Rejection dated Oct. 17, 2008 for U.S. Appl. No. 11/022,079 in the United States Patent Office.
Notice of Allowance and Examiner Interview Summary dated Apr. 30, 2009 for U.S. Appl. No. 11/022,079 in the United States Patent Office.
Notice of Allowance dated Aug. 25, 2009 for U.S. Appl. No. 11/022,079 in the United States Patent Office.
Non-Final Rejection dated May 1, 2007 for U.S. Appl. No. 11/022,023 in the United States Patent Office.
Notice of Allowance dated Oct. 22, 2007 for U.S. Appl. No. 11/022,023 in the United States Patent Office.
Notice of Allowance dated Mar. 25, 2008 for U.S. Appl. No. 10/635,103 in the United States Patent Office.
Non-Final Rejection dated Sep. 17, 2007 for U.S. Appl. No. 10/635,079 in the United States Patent Office.
Notice of Allowance dated Jun. 6, 2008 for U.S. Appl. No. 10/635,079 in the United States Patent Office.
Non-Final Rejection dated Jun. 27, 2007 for U.S. Appl. No. 10/635,083 in the United States Patent Office.
Final Rejection dated Jan. 4, 2008 for U.S. Appl. No. 10/635,083 in the United States Patent Office.
Notice of Allowance dated Jun. 3, 2008 for U.S. Appl. No. 10/635,083 in the United States Patent Office.
English translation of German Office Action (Appl. No. 102005020656.5-25) dated Jan. 4, 2006.
GB Search Report (GB 04049007.2) dated Aug. 17, 2004.
GB Search Report (GB 0510741.2) dated Sep. 16, 2005.
EP Search Report dated Sep. 16, 2005.
English translation of German Office Action (10204003867-8.53) dated Mar. 8, 2006.
Affidavit of Richard W. Adkission dated Feb. 17, 2005.

* cited by examiner

DURATION MINIMUM AND MAXIMUM CIRCUIT FOR PERFORMANCE COUNTER

PRIORITY UNDER 35 U.S.C. §119(e) & 37 C.F.R. §1.78

This nonprovisional application claims priority based upon the following prior United States provisional patent application entitled: "DURATION MINIMUM AND MAXIMUM CIRCUIT FOR PERFORMANCE COUNTER," Application No. 60/576,646, filed Jun. 3, 2004, in the name(s) of: Richard W. Adkisson and Tyler J. Johnson, which is hereby incorporated by reference.

CROSS-REFERENCE TO RELATED APPLICATIONS

This application is related to U.S. patent application Ser. No. 11/022,021, filed Dec. 23, 2004 entitled "EDGE DETECT CIRCUIT FOR PERFORMANCE COUNTER"; U.S. patent application Ser. No. 11/022,079, filed Dec. 23, 2004 entitled "PERFORMANCE MONITORING SYSTEM"; U.S. patent application Ser. No. 11/022,023, filed Dec. 23, 2004 entitled "MATCH CIRCUIT FOR PERFORMING PATTERN RECOGNITION IN A PERFORMANCE COUNTER"; U.S. patent application Ser. No. 10/635,103, filed Aug. 6, 2003 entitled "DATA SELECTION CIRCUIT FOR PERFORMANCE COUNTER"; U.S. patent application Ser. No. 10/635,373, filed Aug. 6, 2003 entitled "ZEROING CIRCUIT FOR PERFORMANCE COUNTER"; and U.S. patent application Ser. No. 10/635,083, filed Aug. 6, 2003 entitled "GENERAL PURPOSE PERFORMANCE COUNTER"; all of which are hereby incorporated by reference in their entirety.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in the area of determining test coverage. It would also be advantageous to be able to use the performance counters to detect any arbitrary binary pattern of up to M bits aligned on block boundaries. Finally, it would be advantageous to detect minimum and/or maximum duration of an event relating to, e.g., the states of certain logic under test. These applications are not supported by the state-of-the-art performance counters.

SUMMARY

In one embodiment, the invention is directed to a circuit for tracking the minimum and maximum duration of an event of interest. The circuit is connected to a counter for counting a number of clock cycles that the event of interest is active and comprises logic for detecting deactivation of the event of interest and generating a duration end signal; logic responsive to the duration end signal for comparing a count value with a shadow value; and logic for updating the shadow value based on results of the comparing.

DETAILED DESCRIPTION OF THE DRAWINGS

Figure 1:
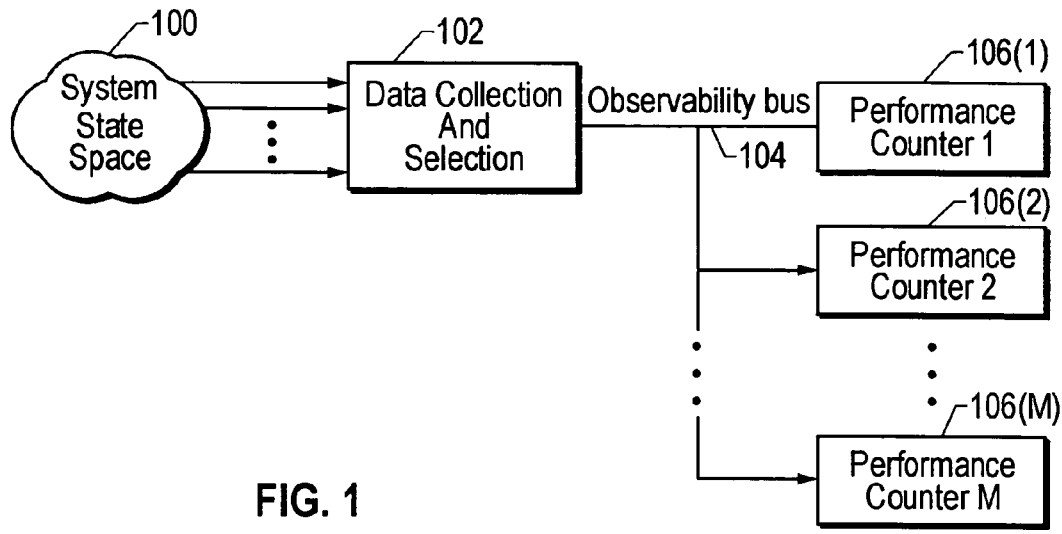
FIG. 1 is a block diagram illustrating general purpose data collection in a logic design.

In the drawings, like or similar elements are designated with identical reference numerals throughout the several views thereof, and the various elements depicted are not necessarily drawn to scale.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability, bus 104 carrying a D-bit debug_ bus signal to a plurality of performance counters 106(1)-106 (M).

In one embodiment, D is equal to 80, M is equal to 12, and performance counters 106(1)-106(M−1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
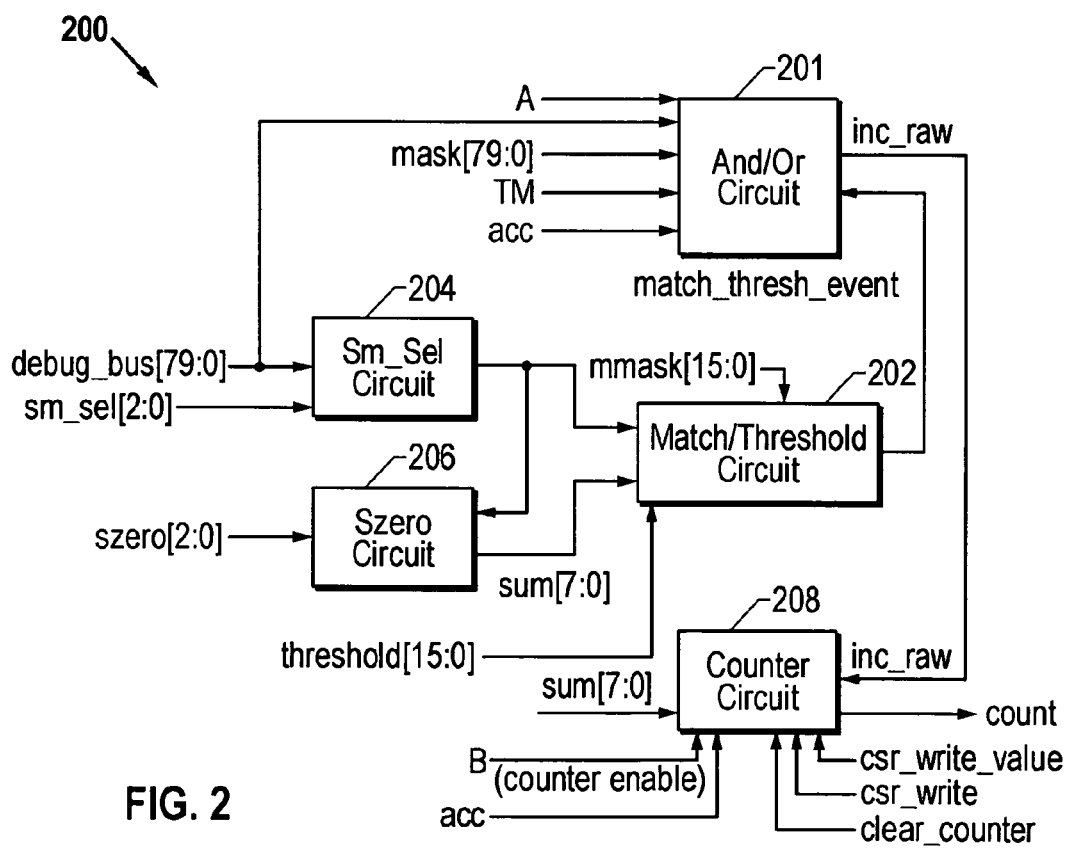
FIG. 2 is a block diagram of a general purpose performance counter according to one embodiment.

FIG. 2 is a block diagram of a general purpose performance counter 200, which is identical in all respects to each of the performance counters 106(1)-106 (M−1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, and a counter circuit 208.

Figure 3A:
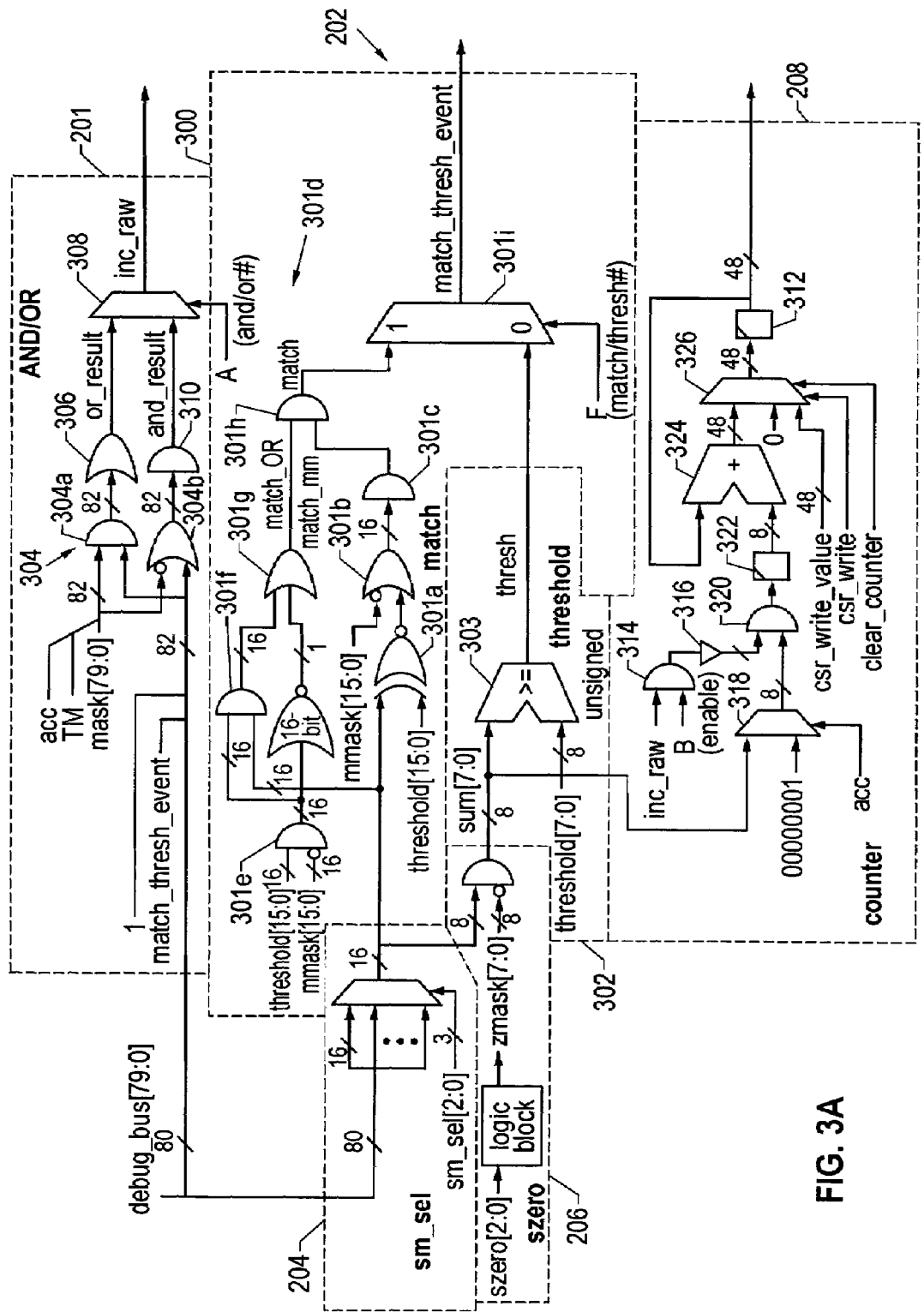
FIG. 3A is a more detailed block diagram of the general purpose performance counter of FIG. 2.
Figure 3B:
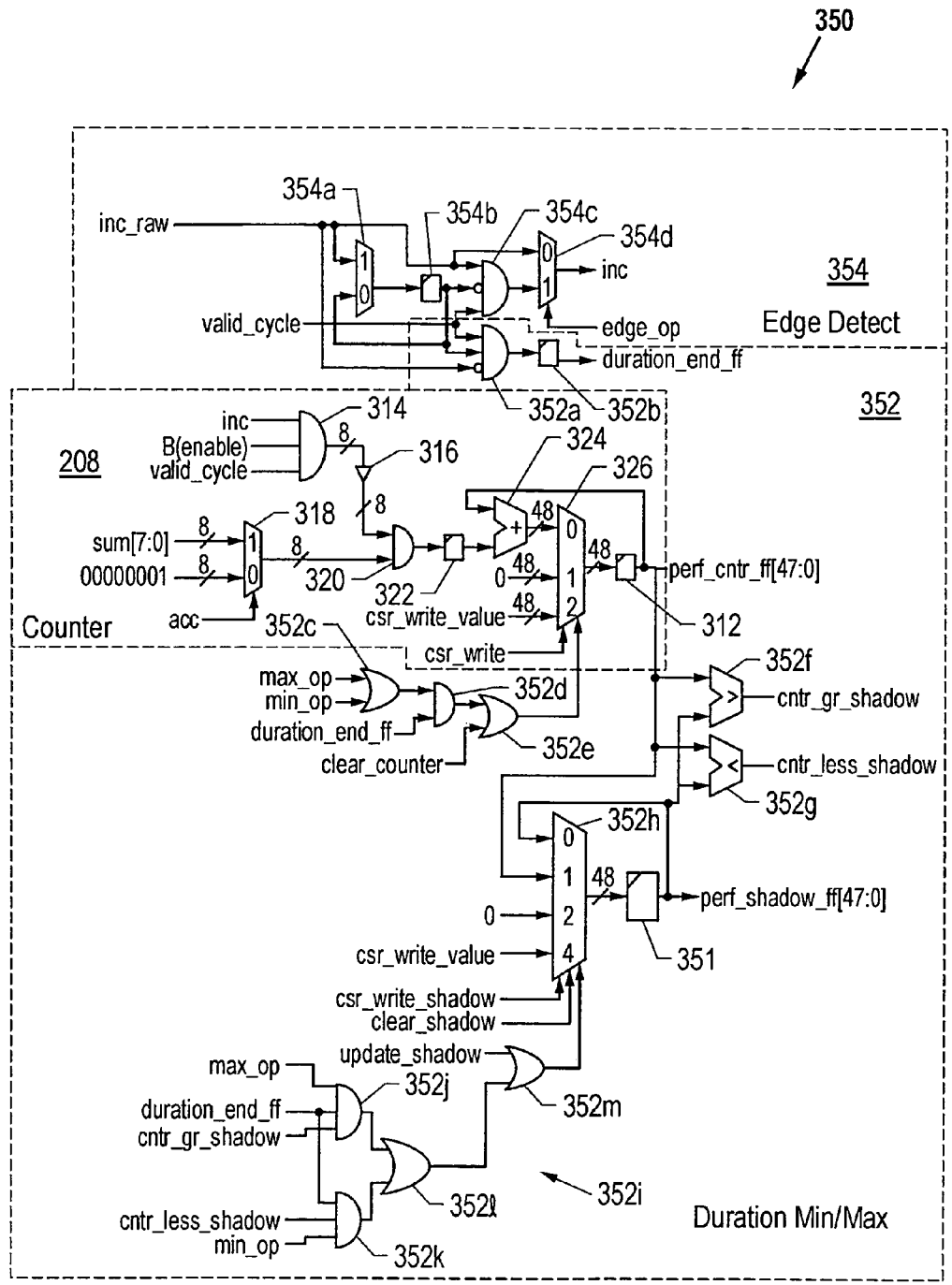
FIG. 3B is a detailed block diagram of an edge detect and duration Min/Max circuit enhancement to the general purpose performance counter of FIG. 3A.

In general, the AND/OR circuit 201 enables access to all of the bits of the debug_bus signal coming into the performance counter 200 via the observability bus 104. In one embodiment, as illustrated in FIGS. 2, 3A, and 3B, debug_bus is an 80-bit signal. When the AND/OR circuit 201 is operating in AND mode, the circuit activates an "inc_raw" signal if all of the bits of the debug_bus signal plus two bits that are appended thereto, as will be described in greater detail below, that are of interest (as indicated by the value of an 80-bit "mask" plus two bits that are appended thereto) are set. When the AND/OR circuit 201 is operating in OR mode, the circuit activates the inc_raw signal if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3A) of the circuit activates a match_thresh_event signal to the AND/OR circuit 201 when an N-bit portion of the debug_bus signal selected as described in greater detail below with reference to the sm_sel circuit 204 and the szero circuit 206 matches an N-bit threshold (or pattern) for all bits selected by an N-bit match mask ("mmask"). In one embodiment, for all bits of the selected N-bit debug bus signal portion that are "don't cares", the corresponding bit of mmask will be set to 0 and the corresponding bit of the threshold will be set to 0. For all bits of the selected N-bit debug bus signal portion that are "ORs" or "Rs", as will be described in detail below, the corresponding bit of mmask will be set to 0 and the corresponding bit of the threshold will be set to 1. Finally, for all bits of the selected N-bit debug bus signal portion that are not "don't cares" or "ORs", the corresponding bit of mmask will be set to 1.

The embodiment illustrated in FIG. 3A enhances the normal match with an "R" term without using any control bits in addition to mmask (the mask) and threshold (the match). This embodiment can be used for any match circuit and for any pattern recognition; it is not limited to performance counters. In particular, a match occurs if any "R" bit is a one. This is the equivalent of an ORing of all "R" input bits. If all "R" bits are zero, there is no match.

The match_thresh_event signal is one of the two bits appended to the debug_bus signal. In the illustrated embodiment, N is equal to 16. In general, when the match/threshold circuit 202 is operating in match mode, the match portion 300 detects in the debug_bus signal any arbitrary binary pattern of up to N bits aligned on 10-bit block boundaries. This includes matching a one, zero, or "don't care" ("X") on any bit. Additionally, as indicated above, in one embodiment, the detecting includes matching the results of an "OR" operation on all designated bits ("R"). This allows detection of specific packets or specific groups of packets or states.

In one embodiment, the match portion 300 comprises an exclusive NOR ("XNOR") circuit, represented in FIG. 3A by a single XNOR gate 301a, for bit-wise exclusive-NORing ("XNORing") a selected N-bit portion of the debug_bus signal output from the sm_sel circuit 204, as described in detail below, with an N-bit threshold which may be output from a control status register ("CSR") (not shown), for example. An N-bit signal output (i.e., a first intermediary output) from the XNOR circuit (represented by the XNOR gate 301a, although there may be as many as N such gates) is input to an OR circuit, represented in FIG. 3A by a single OR gate 301b, where it is bit-wise ORed with the inverse of the N-bit mmask, which may be provided by a CSR (not shown) in one embodiment. The N-bit output (i.e., a second intermediary output) of the OR circuit represented by the OR gate 301b (each of the N output bits being generated by a signal 2-input OR gate) are input to an N-bit AND gate 301c, the output of which comprises a one-bit "match_mm" signal.

As described in greater detail in U.S. patent application Ser. No. 11/022,023, filed Dec. 23, 2004 entitled "MATCH CIRCUIT FOR PERFORMING PATTERN RECOGNITION IN A PERFORMANCE COUNTER", the match circuit 300 further includes an enhancement portion 301d for matching the "R" bits. The enhancement portion 301d includes an AND circuit, represented in FIG. 3A by a single AND gate 301e, for bit-wise ANDing the inverse of the N-bit mmask with the N-bit threshold. The N-bit output of the AND circuit 301e is input to an AND circuit, represented in FIG. 3A by a single AND gate 301f, where it is bit-wise ANDed with the selected N-bit portion of the debug_bus signal output from the sm_sel circuit 204. The N-bit output of the AND circuit 301f is input to an OR circuit 301g, where it is ORed with the single-bit NOR (provided by N-bit NOR gate) of the N-bit output of the AND circuit 301e to generate a single bit "match_OR" signal. The match_OR signal and the match_mm signal are input to an AND gate 301h, the output of which is input to one input of a two-input MUX 301i as a "match" signal. When the match/threshold circuit 202 is operating in match mode (as controlled by a selection control signal, e.g., the match/thresh# control signal), the match signal is output from the MUX 301i as the match_thresh_event signal to the AND/OR circuit, as described above.

As a result of the operation of the match portion 300, no extra random logic is required for decoding packets or states into "one-hot" signals, which are 1-bit signals that transition to a logic "1" for each value of the state. The match/threshold circuit 202 requires an N-bit pattern field and an N-bit mask field. In addition, the embodiment described herein can match a wider range of patterns than a conventional match circuit, which corresponds to a level of AND gates.

To reduce the number of control bits required, in the embodiment illustrated in FIG. 3A, the N-bit pattern field is the same field used for a threshold portion 302 of the circuit 202, as described below, as it is unlikely that both the match portion 300 and the threshold portion 302 will be used at the same time, especially if the sm_sel circuit 204 supplies the same N bits to both.

When the match/threshold circuit 202 is operating in "threshold" mode, the threshold portion 302 of the circuit 202 activates the match_thresh_event signal to the AND/OR circuit 201 when an S-bit portion of the debug bus signal selected and zeroed as described in greater detail below with reference to the sm_sel circuit 204 and the szero circuit 206 is equal to or greater than the threshold. In the illustrated embodiment, S is equal to N/2, or 8.

A compare circuit 303 of the threshold portion 302 compares a sum[7:0] signal output from the szero circuit 206, described below, with the least significant S bits of the N-bit threshold signal and outputs a logic one if the former is greater than or equal to the latter and a zero if it is not. The output of the compare circuit 303 is input to a second input of the MUX 301i as a thresh signal. When the match/threshold circuit 202 is operating in threshold mode, the thresh signal is output from the MUX 301*i* as the match_thresh_event signal to the AND/OR circuit, as described above.

It will be recognized that in systems in which the performance counter 200 and the logic block monitored thereby are in two different clock domains, the match/threshold circuit 202 will be modified to take advantage of a "core mode functionality," in which a valid_cycle control signal is generated in accordance with the teachings of U.S. patent application Ser. No. 11/022,079, filed Dec. 23, 2004 entitled "PERFORMANCE MONITORING SYSTEM". Briefly, in some instances, the performance counter 200 may be used to examine the inner workings of logic hardware that is in a different clock domain than the performance counter. Core mode supports the disabling of the performance counter on invalid clock cycles and enables advanced features to ignore the invalid cycles.

The sm_sel circuit 204 selects an N-bit portion of the debug_bus signal aligned on a selected 10-bit block boundary into both the match portion 300 and the threshold portion 302 (FIG. 3A) of the match/threshold circuit 202 and to a sum input of the counter circuit 208. As previously stated, in the illustrated embodiment, N is equal to 16. The szero circuit 206 zeroes out none through all but one of S bits aligned on a selected 10-bit block boundary into the threshold portion 302 of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204.

Additional details regarding the operation of the sm_sel circuit 204 and the szero circuit 206 are provided in U.S. patent application Ser. No. 10/635,103, filed Aug. 6, 2003 entitled "DATA SELECTION CIRCUIT FOR PERFORMANCE COUNTER" and U.S. patent application Ser. No. 10/635,373, filed Aug. 6, 2003 entitled "ZEROING CIRCUIT FOR PERFORMANCE COUNTER".

FIG. 3B illustrates an edge detect and duration Min/Max circuit 350 enhancement to the performance counter illustrated in FIG. 3A according to one embodiment. In this embodiment, a shadow register 351 samples the count signal on an interval, when software requests it, or when value in the count register 312 is larger or smaller than the value stored in the shadow register (i.e., shadow value) at the end of counting a duration. The last feature, in conjunction with duration Min/Max circuitry 352, enables the capture of a minimum or maximum duration value. In particular, the duration Min/Max circuitry 352 tracks minimum/maximum cycle counts, or durations. In particular, at the end of an event, the value of the count register 312 is stored in the shadow register 351 if is larger than the value currently in the shadow register (when the performance counter 200 is operating in duration MAX mode) or smaller than the value currently stored in the shadow register (when the performance counter 200 is operating in duration MIN mode).

Edge detect circuitry 354 detects a rising edge on the inc_raw signal and only asserts an "inc" signal to the counter circuit 208 one time for each rising edge when the performance counter 200 is operating in edge detect mode.

In one embodiment, the performance counter 200 operates in edge detect mode when an "edge_op" signal is asserted, in duration MAX mode when a "max_op" signal is asserted, and in duration MIN mode when a "min_op" signal is asserted. The performance counter operates in normal mode when none of the "_op" signals is asserted.

As previously indicated, in normal operational mode, the performance counter 200 counts the number of cycles an event of interest is active. The embodiment of the edge detect circuitry 354 described herein enables the performance counter 200 operate in edge detect mode, in which the performance counter counts the number of times an event occurs. For example, assuming a state machine begins in state=0, transitions to state=2 and remains there for three cycles, transitions to state=1 and remains there for some number of cycles, transitions to state=2 and remains there for four cycles, transitions to state=3 and remains there for some number of cycles, transitions to state=2 and remains there for two cycles, and then transitions back to state=0. It will be assumed for the sake of example that the event of interest is state=2.

In normal mode, the performance counter 200 counts the number of cycles the designated event is active; in this case, nine cycles. In contrast, the edge detection circuitry 354 enables a performance counter 200, when in edge detect mode, to count the number of times the state machine transitions to state=2. In edge detect mode, the performance counter 200 counts three zero (i.e., not in state=2) to one (i.e., in state=2) transitions. Accordingly, in the current example, the count of a performance counter operating in edge detect mode indicates the number of times the event of interest (i.e., transition to state=2) occurred (i.e., three).

It should be noted that, although the illustrated embodiment shows a rising edge detect circuit, a falling edge detect circuit could also be implemented for the purposes described herein and may be preferable under certain circumstances.

By operating one performance counter in normal mode to count the number of cycles an event of interest is active and operating another in edge detect mode to count the number of times the same event occurs, it is possible to determine the average number of cycles the event is active. Referring again to the above example, the first performance counter would indicate that the event (state=2) was active for nine cycles; the second performance counter would indicate that the event occurred three times. Accordingly, the average number of cycles the event was active (i.e., the average number of cycles state=2) is three.

Details regarding the operation of the edge detect circuitry 354 are provided in U.S. patent application Ser. No. 11/022,021, filed Dec. 23, 2004 entitled EDGE DETECTION CIRCUIT FOR PERFORMANCE COUNTER, previously incorporated by reference.

Typically, a performance counter counts the number of cycles an event is active; however, it does not track the maximum or minimum duration of an event during a time period of interest. The duration Min/Max circuitry 352 enables the performance counter 200 to report the minimum time an event persists when it is active or the maximum time an event persists when it is active. Using the example set forth above with respect to the state machine, in which the event of interest is state=2, in duration MIN mode, the shadow register will capture three (cycles), ignore the four (cycles) (because three is less than four), and then capture two (cycles) (because two is less than three). In duration MAX mode, the shadow register will capture three (cycles), then capture four (cycles) (because four is greater than three), and ignore two (cycles) (because four is greater than two). Accordingly, the minimum duration of the event (state=2) during the period of interest is two cycles and the maximum duration of the event is four cycles.

The edge detection circuitry 354 will now be described in greater detail. The circuitry 354 includes a two-input MUX 354*a* for receiving the inc_raw signal at one input and an inc_hold_FF signal at the other input. The output of the MUX 354*a* is input to a flip flop 354*b*, the output of which comprises the inc_hold_FF signal, which is fed back to the MUX 354*a*, as previously described. The valid_cycle control signal described above comprises the select signal for the MUX 354a such that when the valid cycle signal is asserted, the inc_raw signal is output from the MUX 354a; otherwise, the inc_hold_ff signal is output from the MUX. The inc_hold_ff signal is inverted and ANDed with the inc_raw signal and the valid cycle signal via a three input AND gate 354c. The output of the AND gate 354c is input to one input of a two-input MUX 354d, the other input of which is connected to receive the inc_raw signal. The edge_op signal serves as the select signal to the MUX 354d, such that when the performance counter 200 is operating in edge detect mode, the signal output from the AND gate 354c is output from the MUX 354d as the inc signal; otherwise (i.e., in normal operation), the inc_raw signal is output from the MUX as the inc signal 354d.

It will be noted that the flip flop 354b and the AND gate 354c serve as rising-edge detect circuitry for the edge detect circuitry 354 and the output of the AND gate 354c will be driven high responsive to a zero-to-one transition of the inc_raw signal; otherwise, the output of the AND gate 354c will remain zero. The foregoing assumes, of course, that the cycle is a valid one (i.e., valid_cycle is asserted).

The circuitry 352 includes falling edge detect logic comprising a three-input AND gate 352a for ANDing the valid_cycle signal, the inc_hold_ff signal output from the flip flop 354b, and the inc_raw signal. The output of the AND gate 352a is input to a flip flop 352b, the output of which comprises a duration_end_ff signal. It will be recognized that flip flop 354b, the AND gate 352a, and the flip flop 352b serve as falling-edge detect circuitry for the duration Min/Max circuitry 352 and the output of the AND gate 352a will be driven high responsive to a one-to-zero transition of the inc_raw signal; otherwise, the output of the AND gate 352a will remain zero. The foregoing assumes, of course, that the cycle is a valid one (i.e., valid_cycle is asserted). The circuitry can be implemented without regard to valid cycles by eliminating the valid_cycle input of the AND gate 352a. Accordingly, activation of duration_end_ff indicates that the event of interest has ended.

Figure 3C:
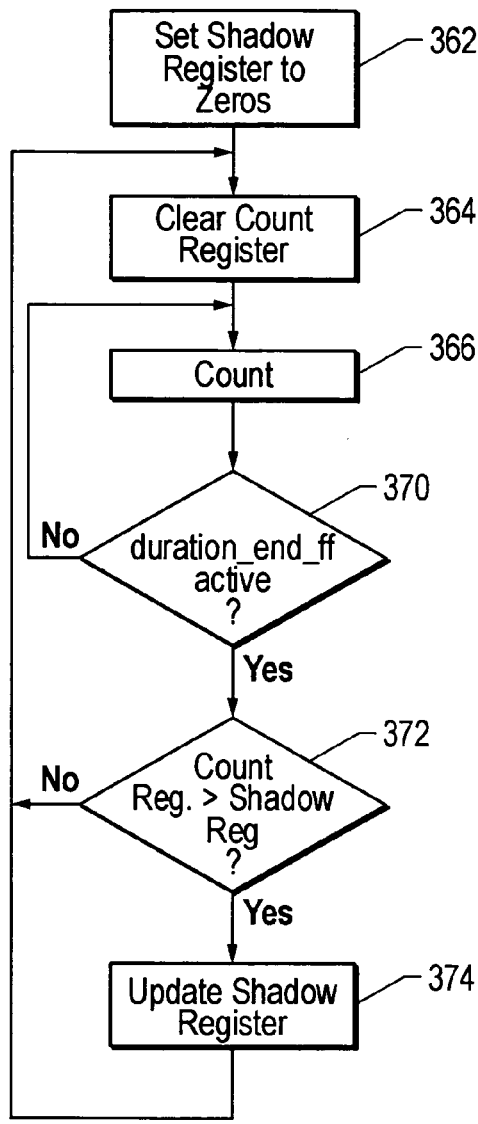
FIGS. 3C and 3D are flowcharts illustrating operation of the duration Min/Max circuit enhancement of FIG. 3B in duration MAX and duration MIN modes, respectively.
Figure 3D:
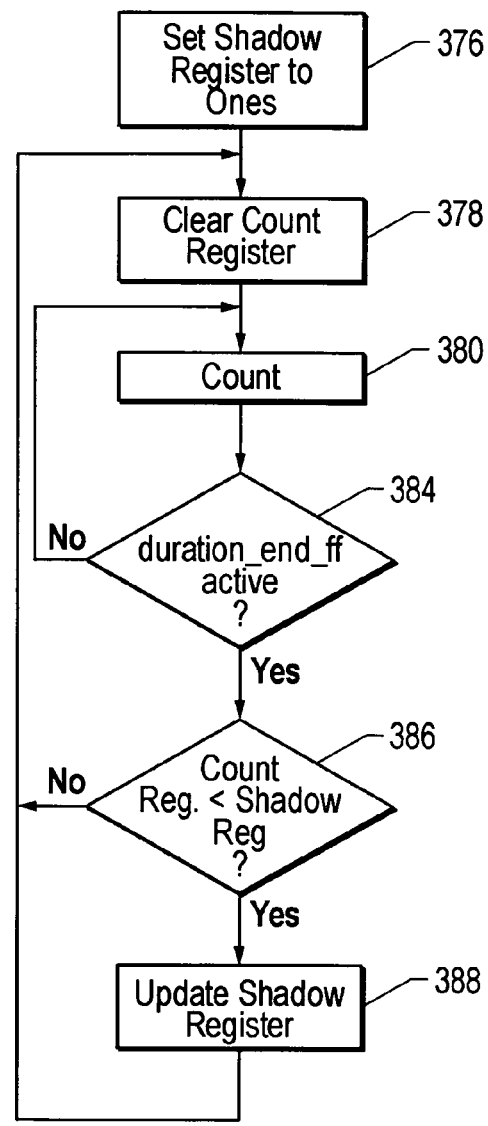

FIGS. 3C and 3D are flowcharts illustrating operation of the duration Min/Max circuitry 352 in duration MAX mode and duration MIN mode, respectively, in accordance with one embodiment. It should be noted that, in the embodiment illustrated in FIG. 3B, it is assumed that the circuitry 352 operates either in duration MAX mode (max_op activated), in which the maximum duration is tracked for the event of interest during a time period of interest, or in duration MIN mode (min_op activated), in which the minimum duration is tracked for the event of interest during the time period of interest. In particular, as shown in FIG. 3B, the one of the enable inputs of the MUX 326 that was previously connected directly to the clear_counter signal (FIG. 3A) is now connected to a logic circuit comprising a first two-input OR gate 352c, a two input AND gate 352d, and a second two-input OR gate 352e. The max_op and min_op signals are input to the first two-input OR gate 352c, the output of which is input to one input of the AND gate 352d. The other input of the AND gate 352d is connected to receive the duration_end_ff signal from the flip flop 352b. The output of the AND gate 352d is input to one input of the OR gate 352e, the other input of which is connected to receive the clear_counter signal. As a result, the counter 312 will be cleared whenever either clear_counter is activated or either max_op or min_op is activated and duration_end_ff is activated. It will be recognized, however, that appropriate modifications may be made to the circuitry 352 such that both minimum and maximum duration could be simultaneously tracked for the event of interest.

As previously noted, FIG. 3C illustrates operation of the circuitry 352 while max_op is active. Accordingly, In step 362, the value stored in the shadow register 351 is set to all zeros. In step 364, the value of the count register 312 is cleared. In step 366, the performance counter performs in accordance with the operational description set forth above with reference to FIG. 3A and the value stored in the count register 312 is incremented accordingly while an event is active.

In step 370, a determination is made whether a duration_end_ff signal is active, indicating that the end of the event has been detected, as described above. If not, execution returns to step 366; otherwise, execution proceeds to step 372.

In step 372, a determination is made whether the value stored in the count register 312 is greater than the value stored in the shadow register 351. This step 372 is performed by a comparator 352f. If so, a signal cntr_gr_shadow is activated, causing the value of the count register 312 to be written to the shadow register 351 in step 374. Execution then returns to step 364. If a negative determination is made in step 374, execution returns directly to step 364.

FIG. 3D illustrates operation of the circuitry 352 while min_op is active. In step 376, the shadow register 351 is set to all ones. In step 378, a value of the count register 312 is cleared. In step 380, the performance counter performs in accordance with the operational description set forth above with reference to FIG. 3A and the value stored in the count register 312 is incremented accordingly while an event is active. In step 384, a determination is made whether a duration_end_ff signal is active, indicating that the end of the event has been detected, as described above. If not, execution returns to step 380; otherwise, execution proceeds to step 386.

In step 386, a determination is made whether the value stored in the count register 312 is less than the value stored in the shadow register 351. This step 386 is performed by a comparator 352g. If so, a signal cntr_less_shadow is activated, causing the value of the count register 312 to be written to the shadow register 351 in step 388. Execution then returns to step 378. If a negative determination is made in step 386, execution returns directly to step 378.

In order to accomplish the operation described with reference to FIG. 3C, a MUX 352h is used to enable a selected one of four values input to the MUX to be written to the shadow register 351. In particular, when a signal "csr_write_shadow" is activated and applied to a third enable input, a CSR_write_value is written to the shadow register 351. This is the mechanism used to write all zeroes (in step 362) or all ones (in step 376) to the shadow register 351. When a signal "clear_shadow" is activated and applied to a second enable input, a series of zeros are written to the shadow register 351, thus clearing the register 351. The remaining enable input is connected to a logic circuit 352i comprising two AND gates 352j, 352k, and two OR gates 352l, 352m. The first AND gate 352j ANDs the values of max_op, duration_end_ff, and cntr_gr_shadow. The other AND gate 352k ANDs the values of min_op, duration_end_ff, and cntr_less_shadow. The outputs of both AND gates 352j, 352k, are input to the OR gate 352l. The output of the OR gate 352l is ORed with an update_shadow signal. The output of the OR gate 352m is applied to the remaining enable input of the MUX 352h.

As a result, if any one of the following is true, the value of the count register 312 will be written to the shadow register 351:

1. the signal update_shadow is activated;
2. the performance counter is operating in duration MAX mode, the event has ended, and the value of the count register 312 is greater than that of the shadow register 351; OR
3. the performance counter is operating in duration MIN mode, the event has ended, and the value of the count register 312 is less than that of the shadow register 351.

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Those 16 bits are aligned to 10 slot boundaries as shown in an exemplary mapping arrangement illustrated in FIG. 4.

Figure 4:
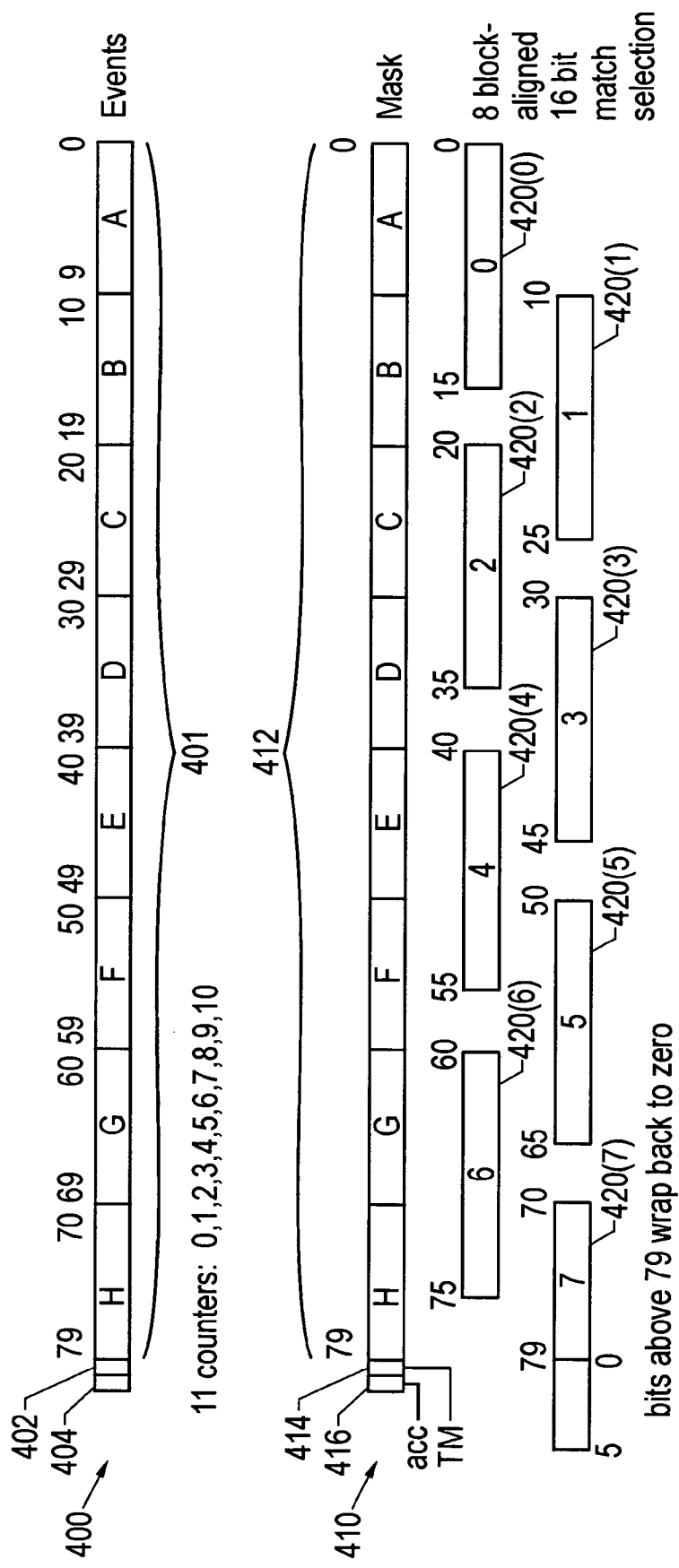
FIG. 4 illustrates a method in which signals are mapped from an observabilty bus to a performance counter in accordance with one embodiment.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal.

As best illustrated in FIG. 3A, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3A, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420 (0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3A, the first logic stage 304 comprises an AND portion, represented by an AND gate 304a, for bit-wise ANDing the events signal 400 with the composite mask signal 410, and an OR portion, represented by an OR gate 304b, for bit-wise ORing the inverse of the composite mask signal 410 with the events signal 400. It will be recognized that, although represented in FIG. 3A as a single two-input AND gate 304a, the AND portion of the first logic stage 304 actually comprises 82 two-input AND gates. Similarly, the OR portion of the first logic stage 304 comprises 82 two-input OR gates identical to the OR gate 304b.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") which may originate from a CSR (not shown) controls whether the AND/OR circuit 201 functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be activated when all of the bits of the events signal 400 that are of interest as specified by the composite mask 410 are set. When the AND/OR circuit 201 is operating in OR mode, the inc signal comprises the or_result signal and will be activated when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Continuing to refer to FIG. 3A, the operation of an embodiment of the counter circuit 208 will be described in greater detail. The counter circuit 208 is an X bit counter that can hold, increment by one, add S bits, clear, or load a value into a count value register 312. Other processing may also occur in order to read the value of the register 312. In the embodiment illustrated in FIG. 3A, X is equal to 48. Counter circuit 208 operation is enabled by setting a counter enable signal B, which comprises one input of a two-input AND gate 314. The other input of the AND gate 314 is connected to receive the inc signal generated from the inc_raw signal as described in detail above. Accordingly, when the counter circuit 208 is enabled and the inc signal is activated, a logic one is output from the AND gate 314. In any other case, the output of the AND gate 314 will be a logic zero. The output of the AND gate 314 is replicated by an 8× replicator 316 and the resulting 8-bit signal is bit-wise ANDed with an 8-bit signal output from a MUX circuit 318. The inputs to the MUX circuit 318 are the sum[7:0] signal output from the szero circuit 206 and an 8-bit signal the value of which is [00000001]. The sum[7: 0] signal will be output from the MUX circuit 318 when the acc signal is activated; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is activated, the value of csr_write_value is output from the MUX circuit 326 and written to the count value register 312. In this manner, a value can be loaded into the count value register 312. Similarly, when the clear_counter signal is asserted, 48 zero bits are output from the MUX circuit 326 to the count value register 312, thereby clearing the register.

If neither the csr_write signal nor the clear_counter signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters represented by the performance counter 200, making them general purpose. All D bits of the debug_bus signal can be used by the AND/OR circuit 201. N bits aligned on block boundaries can be selected by the sm_sel circuit 206, enabling full coverage of the observabilty bus 104.

An implementation of the invention described herein thus provides a general purpose performance counter. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown may be implemented using CSRs, it will be appreciated that control signals may also be applied in a variety of other manners, including, for example, directly or may be applied via scan registers or Model Specific Registers ("MSRs"). Additionally, although specific bit field sizes have been illustrated with reference to the embodiments described, e.g., 16-bit threshold for pattern matching (where the bottom 8 bits are used for the threshold), 80-bit mask signal, 3-bit sm_sel, et cetera, various other implementations can also be had.

Accordingly, all such modifications, extensions, variations, amendments, additions, deletions, combinations, and the like are deemed to be within the ambit of the present invention whose scope is defined solely by the claims set forth hereinbelow.

What is claimed is:

1. A circuit in a computer system, the circuit comprising:
    logic for detecting deactivation of an event of interest and generating a duration end signal;
    logic responsive to the duration end signal for comparing a count value with a shadow value;
    logic for updating the shadow value based on results of the comparing;
    wherein the circuit is connected to a counter;
    wherein the counter counts a number of clock cycles that the event of interest is active;
    wherein the circuit determines a minimum duration of the event of interest;
    wherein the circuit determines a maximum duration of the event of interest.

2. The circuit of claim 1 further comprising logic for selecting a mode of operation of the circuit.

3. The circuit of claim 2 wherein when a minimum mode of operation is selected, the logic for comparing activates a less than signal responsive to the count value being less than the shadow value.

4. The circuit of claim 3 wherein the logic for updating comprises logic for replacing the shadow value with the count value responsive to activation of the less than signal.

5. The circuit of claim 2 wherein when a maximum mode of operation is selected, the logic for comparing activates a greater than signal responsive to the count value being greater than the shadow value.

6. The circuit of claim 5 wherein the logic for updating further comprises logic for replacing the shadow value with the count value responsive to activation of the greater than signal.

7. The circuit of claim 1 further comprising a count register for storing the count value.

8. The circuit of claim 1 further comprising a shadow register for storing the shadow value.

9. The circuit of claim 1 further comprising logic for detecting a valid clock cycle.

10. The circuit of claim 9 further comprising logic for preventing activation of the duration end signal unless a valid clock cycle is detected.

11. A circuit in a computer system, the circuit comprising:
    means for detecting deactivation of an event of interest and generating a duration end signal;
    means responsive to the duration end signal for comparing a count value with a shadow value; and
    means for updating the shadow value based on results of the comparing;
    wherein the circuit is connected to counter;
    wherein the counter counts a number of clock cycles that the event of interest is active;
    wherein the circuit determines a minimum duration of the event of interest;
    wherein the circuit determines a maximum duration of the event of interest.

12. The circuit of claim 11 further comprising means for selecting a mode of operation of the circuit.

13. The circuit of claim 12 wherein when a minimum mode of operation is selected, the means for comparing activates a less than signal responsive to the count value being less than the shadow value.

14. The circuit of claim 13 wherein the means for updating comprises means for replacing the shadow value with the count value responsive to activation of the less than signal.

15. The circuit of claim 12 wherein when a maximum mode of operation is selected, the means for comparing activates a greater than signal responsive to the count value being greater than the shadow value.

16. The circuit of claim 15 wherein the means for updating further comprises means for replacing the shadow value with the count value responsive to activation of the greater than signal.

17. The circuit of claim 11 further comprising a count register for storing the count value.

18. The circuit of claim 11 further comprising a shadow register for storing the shadow value.

19. The circuit of claim 11 further comprising means for detecting a valid clock cycle.

20. The circuit of claim 19 further comprising means for preventing activation of the duration end signal unless a valid clock cycle is detected.

21. A method of tracking a minimum and a maximum duration of an event of interest in a computer system, the method comprising:
    detecting deactivation of the event of interest and generating a duration end signal;
    responsive to the duration end signal, comparing a count value with a shadow value; and updating the shadow value based on results of the comparing;

wherein a circuit in the computer system connected to a counter for counting a number of clock cycles in the computer system is used to determine when the event of interest is active.

22. The method of claim 21 further comprising selecting a mode of operation of the circuit.

23. The method of claim 22 comprising activating a less than signal responsive to the count value being less than the shadow value when a minimum mode of operation is selected.

24. The method of claim 23 wherein the updating comprises replacing the shadow value with the count value responsive to activation of the less than signal.

25. The method of claim 22 wherein the comparing activates a greater than signal responsive to the count value being greater than the shadow value when a maximum mode of operation is selected.

26. The method of claim 25 wherein the updating further comprises replacing the shadow value with the count value responsive to activation of the greater than signal.

27. The method of claim 21 further comprising detecting a valid clock cycle.

28. The method of claim 27 further comprising preventing activation of the duration end signal unless a valid clock cycle is detected.

* * * * *

UNITED STATES PATENT AND TRADEMARK OFFICE
CERTIFICATE OF CORRECTION

PATENT NO.         : 7,676,530 B2
APPLICATION NO.    : 11/021259
DATED              : March 9, 2010
INVENTOR(S)        : Richard W. Adkisson et al.

It is certified that error appears in the above-identified patent and that said Letters Patent is hereby corrected as shown below:

In column 12, line 28, in Claim 11, after "to" insert -- a --.

Signed and Sealed this

Twenty-fifth Day of May, 2010

David J. Kappos
*Director of the United States Patent and Trademark Office*